United States Patent
Miyoshi

(10) Patent No.: US 9,350,974 B2
(45) Date of Patent: May 24, 2016

(54) IMAGE CAPTURING DEVICE AND IMAGE CAPTURING METHOD OF STEREO MOVING IMAGE, AND DISPLAY DEVICE, DISPLAY METHOD, AND PROGRAM OF STEREO MOVING IMAGE

(75) Inventor: Ai Miyoshi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 574 days.

(21) Appl. No.: 13/603,922

(22) Filed: Sep. 5, 2012

(65) Prior Publication Data

US 2013/0070053 A1 Mar. 21, 2013

(30) Foreign Application Priority Data

Sep. 21, 2011 (JP) .................................. 2011-206171

(51) Int. Cl.
*H04N 13/00* (2006.01)
*H04N 13/02* (2006.01)

(52) U.S. Cl.
CPC ....... *H04N 13/0066* (2013.01); *H04N 13/0239* (2013.01); *H04N 13/0296* (2013.01)

(58) Field of Classification Search
CPC .................................................. H04N 13/0055
USPC ...................................................... 348/43, 46
See application file for complete search history.

(56) References Cited

U.S. PATENT DOCUMENTS

2010/0277567 A1* 11/2010 Takizuka ............... H04N 5/775
348/43

FOREIGN PATENT DOCUMENTS

| JP | 2006-157605 A | 6/2006 |
| JP | 2010-161739 | 7/2010 |
| JP | 2010-263382 A | 11/2010 |

OTHER PUBLICATIONS

Japanese Office Action issued in corresponding application No. 2011-206171 on Apr. 14, 2015.

* cited by examiner

*Primary Examiner* — Jefferey Harold
*Assistant Examiner* — Sihar Karwan
(74) *Attorney, Agent, or Firm* — Carter, DeLuca, Farrell & Schmidt, LLP

(57) ABSTRACT

If there is a discrepancy between a capturing system and a display system of a stereoscopic moving image, the phenomena, such as that the contour of a motion area of an image looks double, may occur, thus posing a problem in the quality of a reproduced image. An image capturing device capturing a stereoscopic moving image includes: an image capturing unit configured to capture a right-eye moving image and a left-eye moving image constituting the stereoscopic moving image, respectively; a unit configured to set an image capturing mode corresponding to the display system of a display device displaying the stereoscopic moving image; and a synchronous signal control unit configured to supply to the image capturing unit a synchronous signal used for capturing the right-eye moving image and the left-eye moving image, respectively, and control a phase of the synchronous signal to supply in accordance with the set image capturing mode.

5 Claims, 16 Drawing Sheets

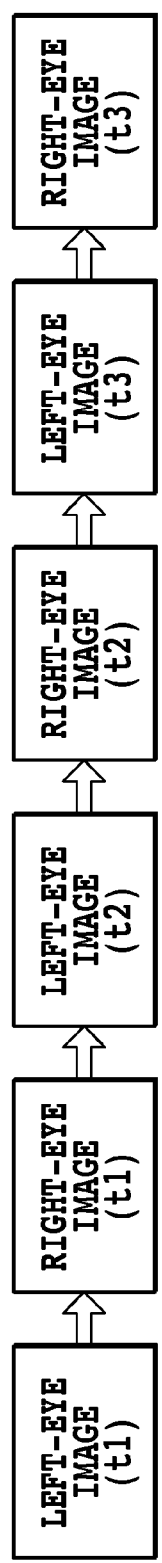
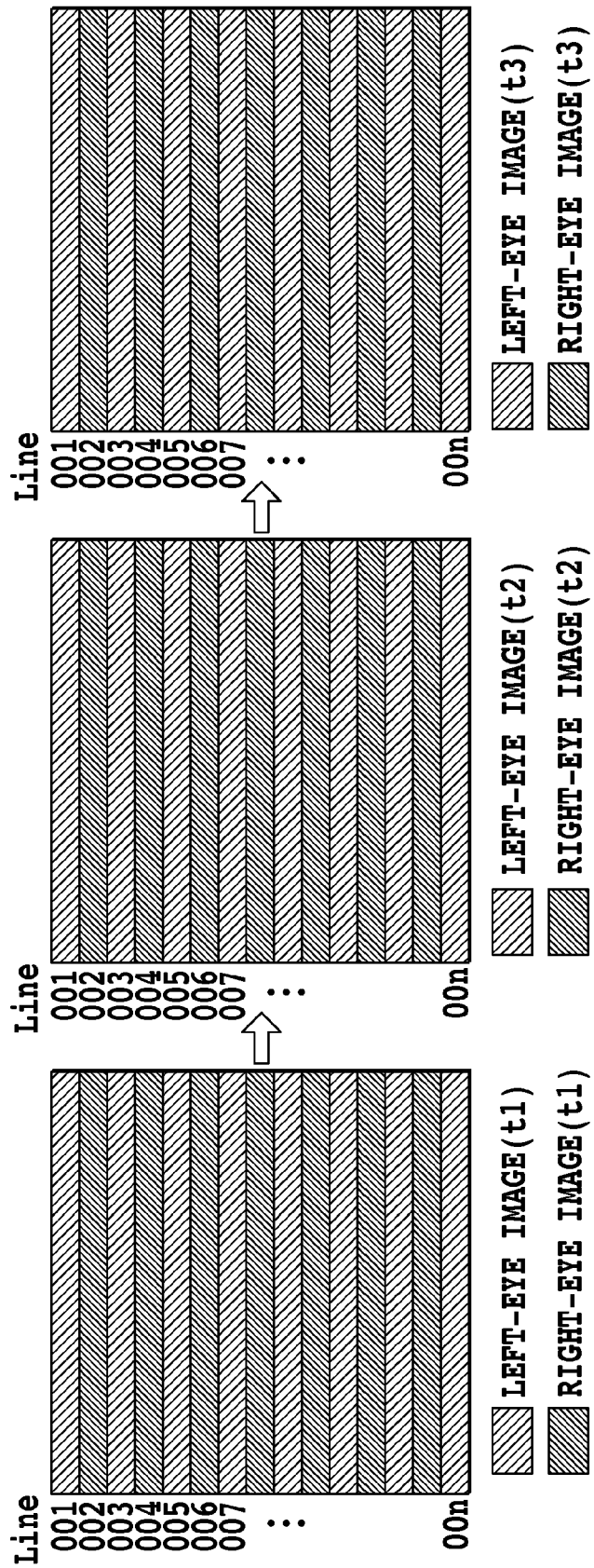
FIG.12A ACTIVE STEREO SYSTEM
FIG.12B PASSIVE STEREO SYSTEM

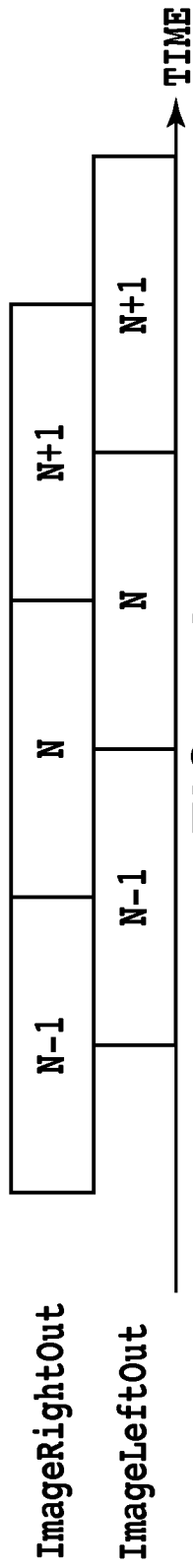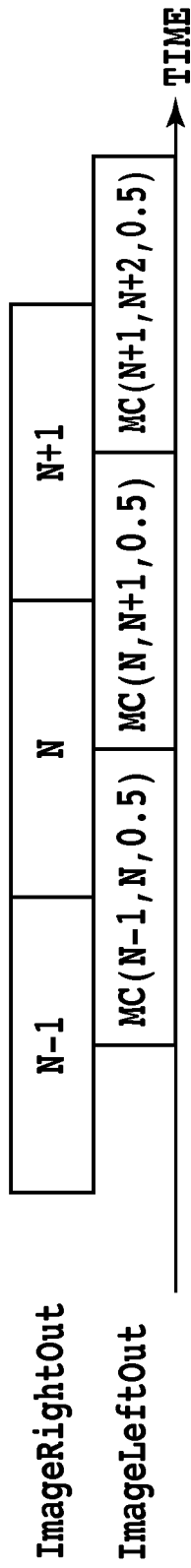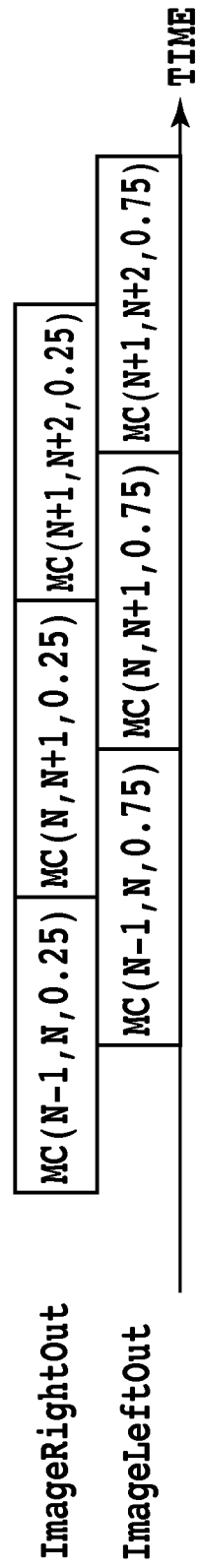

IMAGE CAPTURING DEVICE AND IMAGE CAPTURING METHOD OF STEREO MOVING IMAGE, AND DISPLAY DEVICE, DISPLAY METHOD, AND PROGRAM OF STEREO MOVING IMAGE

BACKGROUND OF THE INVENTION

1. Field of the Invention

The present invention relates to image capturing methods and display methods in capturing and displaying a stereoscopic moving image.

2. Description of the Related Art

In capturing a stereoscopic moving image, a right-eye moving image for displaying to the right eye and a left-eye moving image for displaying to the left eye are separately captured. Such a stereoscopic moving image is typically captured using a system (non-time division system) wherein a right-eye moving image and a left-eye moving image are captured without a time lag. For example, Japanese Patent Laid-Open No. 2010-161739 also discloses an invention assuming that a right-eye moving image and a left-eye moving image are captured with such a non-time division system.

On the other hand, in a display device, there coexist a passive stereo system (non-time division system) wherein a right-eye moving image and a left-eye moving image are temporally-simultaneously displayed and an active stereo system (time-division system) wherein a right-eye moving image and a left-eye moving image are temporally-alternately displayed.

The passive stereo system is a system, wherein left-eye and right-eye images are separated by passing only the light vibrating in a specific direction using a polarization filter, thereby causing the respective left and right eyes of a viewer to view a left-eye moving image and a right-eye moving image, respectively. In this system, before the output light constituting a display image of a display device reaches the eyes of a viewer, the light is separated into the left-eye image light and the right-eye image light via the polarization filter. A viewer, by wearing a pair of polarization eyeglasses, is enabled to view the left-eye image light only with the left eye and view the right-eye image light only with the right eye. A system, wherein a stereoscopic view is realized by inputting the respective left-eye moving image and right-eye moving image to the respective left eye and right eye of a viewer in this manner, is the passive stereo system. In contrast, the active stereo system is a system, wherein the separation of left and right moving images is realized using a pair of shutter-type eyeglasses in synchronization with a frame-switching timing of a display device. In this system, the display device switches and displays a left-eye image and a right-eye image for each frame. A viewer wears a pair of shutter-type eyeglasses so that while a left-eye image is being displayed, the right eye is covered, and while a right-eye image is being displayed, the left eye is covered. A system, wherein a stereoscopic view is realized by inputting the respective left-eye image and right-eye image to the respective left eye and right eye of a viewer in this manner, is the active stereo system.

For capturing of a stereoscopic moving image used for the passive stereo system, an image capturing device of such a type that a stereoscopic moving image is captured with the non-time division system is effective as it is. However, in the case of the active stereo system, because a left-eye image and a right-eye image are alternately displayed, the data of a moving image captured with the non-time division system may pose a problem. That is, if there is a discrepancy between the image-capturing system and the display system, the phenomena that the contour of a motion area of an image looks double or that the motion looks shaky back and forth may occur, thus posing a problem in the quality of a reproduced image. Note that, in the following, the phenomena as described above will be collectively referred to as "collapse of a motion area."

SUMMARY OF THE INVENTION

An image capturing device according to the present invention is the image capturing device capturing a stereoscopic moving image, the device including: an image capturing unit configured to capture a right-eye moving image and a left-eye moving image constituting the stereoscopic moving image; a unit configured to set an image capturing mode corresponding to a display system of a display device displaying the stereoscopic moving image; and a synchronous signal control unit configured to supply to the image capturing unit a synchronous signal used for capturing the right-eye moving image and the left-eye moving image and control a phase of the synchronous signal to supply in accordance with the set image capturing mode.

According to the present invention, the collapse of a motion area during reproduction of a stereoscopic moving image can be suppressed.

Further features of the present invention will become apparent from the following description of exemplary embodiments (with reference to the attached drawings).

BRIEF DESCRIPTION OF THE DRAWINGS

FIGS. 5A and 5B are views illustrating how a stereoscopic moving image captured by the image capturing device according to Embodiment 1 looks when displayed on a display device, wherein FIG. 5A is a view showing how a stereoscopic moving image looks when an image capturing system and a display system do not agree with each other, and FIG. 5B is a view showing how a stereoscopic moving image captured by the application of Embodiment 1 looks;

FIGS. 12A and 12B are views illustrating how a frame image within moving-image data is displayed, wherein FIG. 12A is a view in the case of active stereo system and FIG. 12B is a view in the case of passive stereo system;

FIGS. 15A to 15C are views showing how the data of a stereoscopic moving image captured in an in-phase mode is interpolated and displayed on a display device of the active stereo system.

DESCRIPTION OF THE EMBODIMENTS

Embodiment 1

Figure 1:
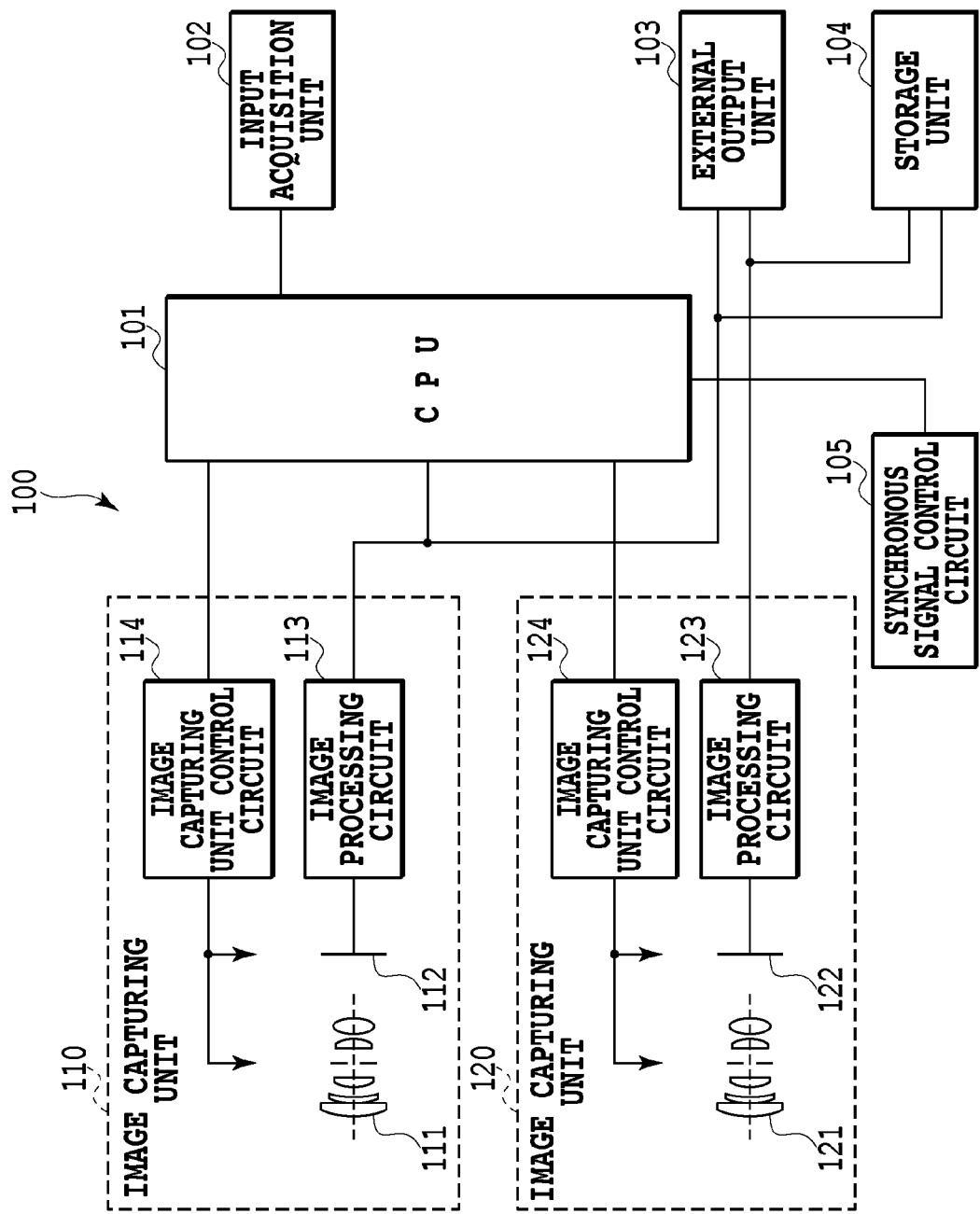
FIG. 1 is a view showing an example of the configuration of an image capturing device according to Embodiment 1.

FIG. 1 is a view showing an example of the configuration of an image capturing device according to Embodiment 1.

An image capturing device 100 includes a CPU 101, an input acquisition unit 102, an external output unit 103, a storage unit 104, a synchronous signal control circuit 105, an image capturing unit 110, and an image capturing unit 120.

The CPU 101 is a processor integrally controlling the image capturing device 100. Although not illustrated, the image capturing device 100 also includes a ROM for storing a control program executed by the CPU 101 and a RAM serving as the work area or the like of the CPU 101.

The input acquisition unit 102 obtains a display mode of a display device, an image capturing frame rate, image-capturing start/termination instructions, and the like input (selected) by a user.

The external output unit 103 outputs to the outside the data of a stereoscopic moving image received from image processing circuits 113 and 123 to be described later.

The storage unit 104 stores the data of a stereoscopic moving image received from the image processing circuits 113 and 123 to be described later. The storage unit 104 includes, for example, an HDD and the like.

The synchronous signal control circuit 105 supplies (outputs) predetermined synchronous signals (a synchronous signal 1 and a synchronous signal 2) corresponding to an image capturing mode to the image capturing units 110 and 120, respectively, via the CPU 101. The synchronous signals control the presence or absence of a time lag (phase lag) between a left-eye moving image and a right-eye moving image captured in the image capturing unit 110 and the image capturing unit 120. The image capturing mode includes two types: an "in-phase mode" corresponding to the non-time division system and an "anti-phase mode" corresponding to the time division system. The "in-phase mode" is a mode, in which image capturing is performed based on the synchronous signal 1 and synchronous signal 2 whose phases agree with each other and thus are in-phase, while the "anti-phase mode" is a mode, in which image capturing is performed based on the synchronous signal 1 and synchronous signal 2 whose phases shift from each other by $1/(2 \times F)$ and thus are anti-phase. The synchronous signal control circuit 105 controls, in accordance with the set image capturing mode, whether the phases of the synchronous signal 1 and the synchronous signal 2 to supply are set in-phase or anti-phase.

The image capturing units 110 and 120 are image capturing units configured to capture a stereoscopic moving image, and in the embodiment, the image capturing unit 110 captures a left-eye moving image and the image capturing unit 120 captures a right-eye moving image, respectively. The image capturing units 110 and 120 each include an image capturing lens (111/121) and an image capturing element (112/122) sensing the incident light from the image capturing lens. Moreover, the image capturing units 110 and 120 each also include an image capturing unit control circuit (114, 124) controlling the image capturing lens and the image capturing element, and an image processing circuit (113/123) processing the signal from the image capturing element and outputting the result as moving-image data. Note that, other than the above-described, there may be various constituent elements but the description thereof is omitted.

Figure 2:
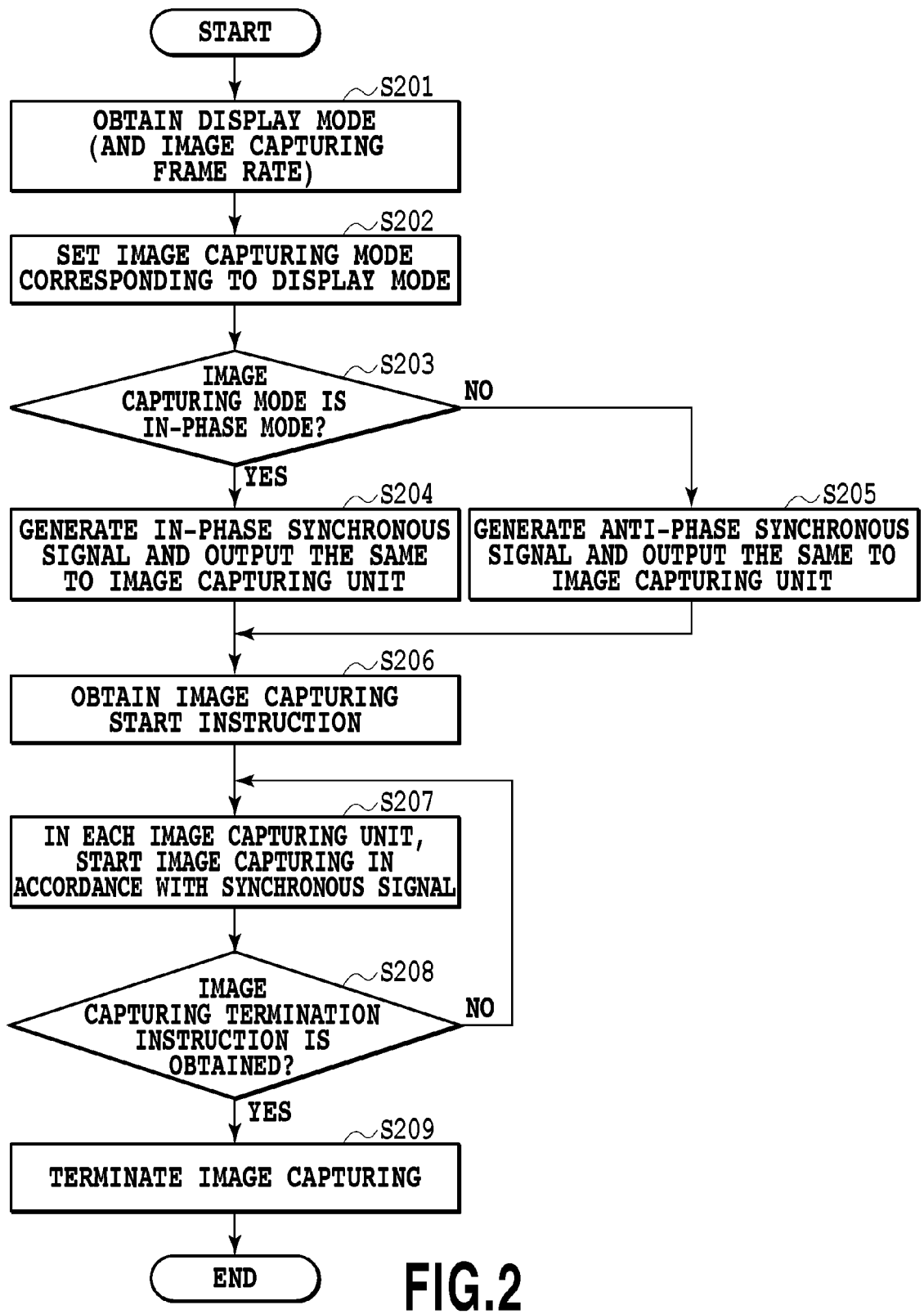
FIG. 2 is a flow chart showing the flow of the processes of capturing a stereoscopic moving image in the image capturing device according to Embodiment 1.

FIG. 2 is a flow chart showing the flow of the processes of capturing a stereoscopic moving image in the image capturing device 100 according to the embodiment.

In Step 201, the input acquisition unit 102 obtains a user input related to the display mode (ModeDisp) of a display device for displaying a stereoscopic moving image and the image capturing frame rate (F). For the display mode (ModeDisp) of the display device, a user selects and inputs a display system (either a passive stereo system or an active stereo system) which the display device employs. For the image capturing frame rate (F), a user inputs a predetermined value (e.g., 30 [fps: frame per second]). That is, in this step, a user selects the display mode depending on whether the display device for displaying a stereoscopic moving image is of the passive stereo system or of the active stereo system, and furthermore inputs an arbitrary image capturing frame rate. Note that, for the image capturing frame rate, a default value may be set in advance so that the default value is employed when any value is not specified by a user.

In Step 202, the CPU 101 sets the image capturing mode (ModeCam) corresponding to the display mode (ModeDisp) specified by the obtained user input and sets the image capturing frame rate (F) to a value also specified by a user. For example, if the display mode specified by a user is the "passive stereo system", the image capturing mode (ModeCam) is set to the "in-phase mode", in which a left-eye moving image and a right-eye moving image are captured without a time lag. Similarly, if the display mode specified by a user is the "active stereo system", the image capturing mode (ModeCam) is set to the "anti-phase mode", in which a left-eye moving image and a right-eye moving image are captured with a time lag. Furthermore, the image capturing frame rate is set to a specified value (for example, if the specified value is "30", the image capturing frame rate is set to 30 [fps]).

In Step 203, the CPU 101 determines whether the set image capturing mode (ModeCam) is the in-phase mode or the anti-phase mode. As a result of the determination, if the set image capturing mode is the in-phase mode, the flow proceeds to Step 204. On the other hand, if the set image capturing mode is the anti-phase mode, the flow proceeds to Step 205.

Figure 3:
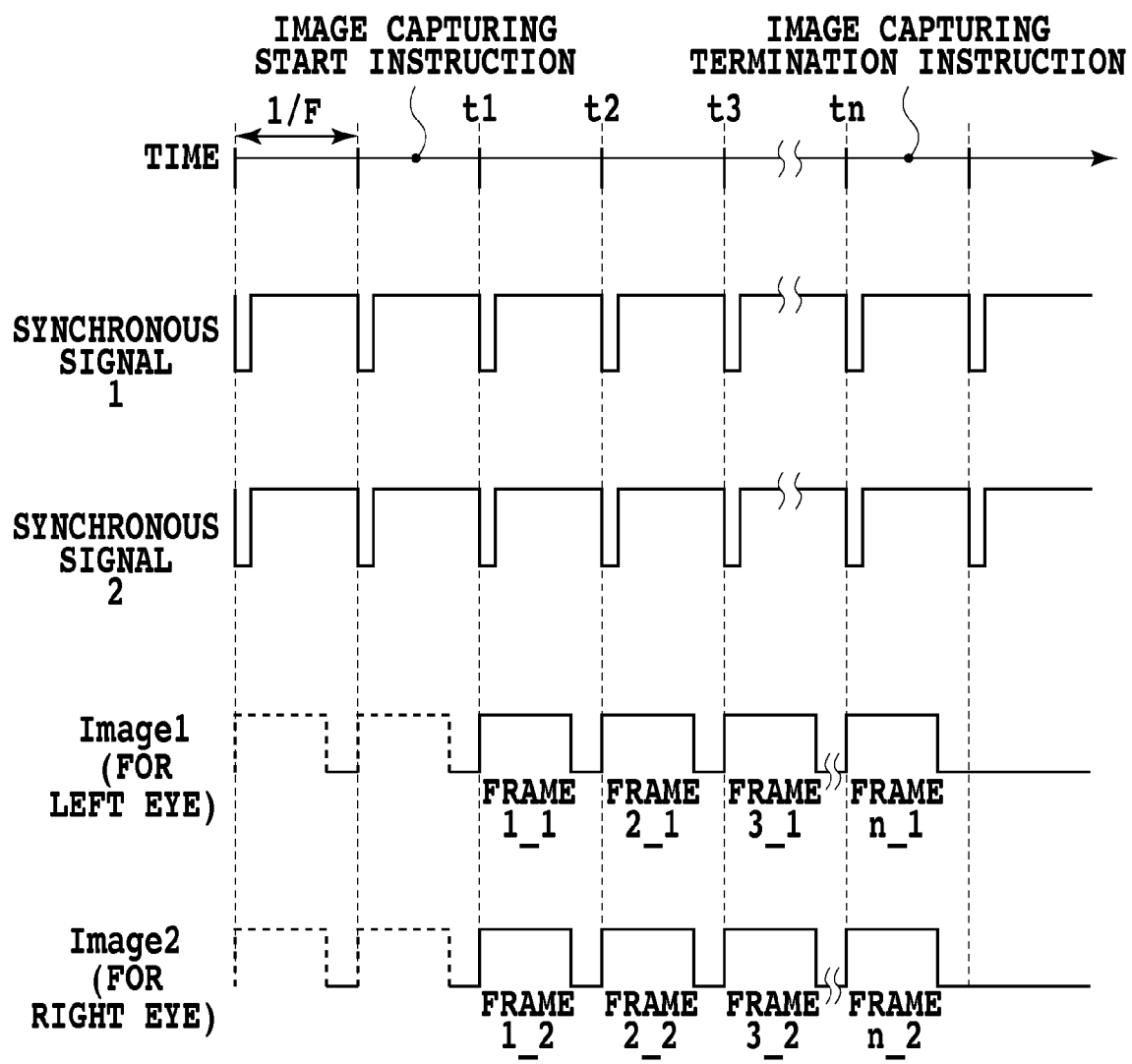
FIG. 3 is a view showing a synchronous signal output from a synchronous signal control circuit, and a left-eye moving image and a right-eye moving image obtained based on the synchronous signal.

In Step 204, the synchronous signal control circuit 105 supplies the synchronous signal for capturing a stereoscopic moving image without a time lag between the right-eye moving image and the left-eye moving image, to both the image capturing units 110 and 120, respectively. Specifically, the in-phase synchronous signals 1 and 2 whose phases agree with each other are generated at the set image capturing frame rate and output to both the image capturing units 110 and 120, respectively. At the same time as these synchronous signals 1 and 2 are output, the image processing circuits 113 and 123 each start to capture a moving image. FIG. 3 shows the synchronous signals 1 and 2 output from the synchronous signal control circuit 105, and a left-eye moving image (Image 1) and a right-eye moving image (Image 2) obtained based on the synchronous signals 1 and 2. In FIG. 3, it may be seen that the phases of the synchronous signals 1 and 2 agree with each other, and also in the obtained left-eye moving image (Image 1) and right-eye moving image (Image 2), the phases are in-phase. In Image 1 and Image 2, although a portion indicated by an initial dotted-line is input to the image processing circuits 113 and 123, respectively, as an image signal, this occurs before an image capturing start instruction is received and therefore this portion indicates a frame image that is not treated as the moving image to be captured. Note that, the frame image indicated by this dotted line is utilized, for example, for a preview display in a non-illustrated display unit.

Figure 4:
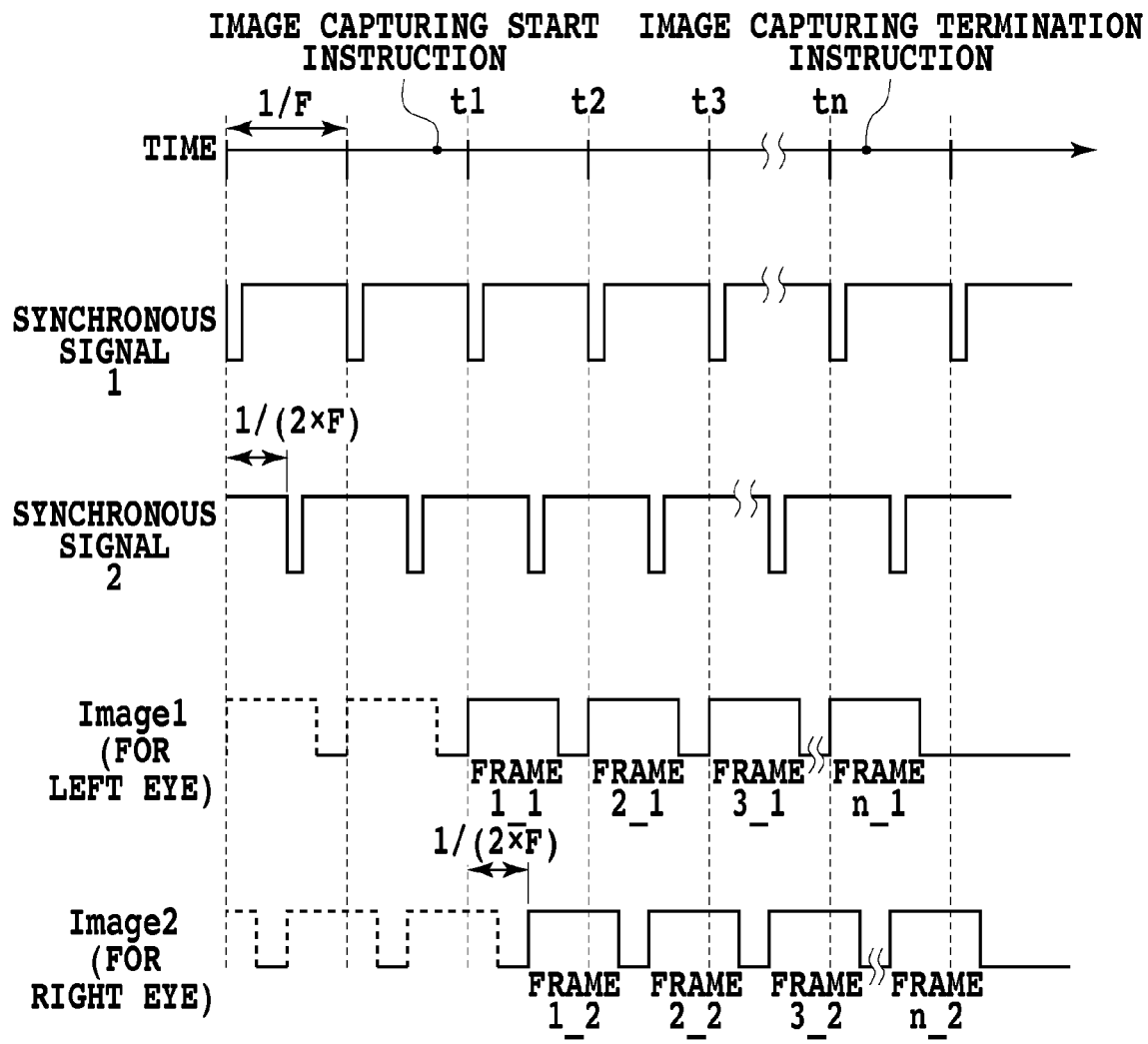
FIG. 4 is a view showing a synchronous signal output from a synchronous signal control circuit, and a left-eye moving image and a right-eye moving image obtained based on the synchronous signal.

In Step 205, the synchronous signal control circuit 105 outputs the synchronous signals for capturing a stereoscopic moving image with a time lag between the left-eye moving image and the right-eye moving image, to both the image capturing units 110 and 120. Specifically, the anti-phase synchronous signals 1 and 2 whose phases shift from each other by a half frame are generated at a selected image capturing frame rate and output to both the image capturing units 110 and 120, respectively. FIG. 4 shows the synchronous signals 1 and 2 output from the synchronous signal control circuit 105, and the left-eye moving image (Image 1) and the right-eye moving image (Image 2) obtained based on the synchronous signals 1 and 2. In FIG. 4, the phases of the synchronous signals 1 and 2 shift from each other by a half frame (1/(F×2)), and also in the obtained left-eye moving image (Image 1) and right-eye moving image (Image 2), the phases shift from each other by a half frame. The other portions are the same as those in FIG. 3 and therefore the description thereof is omitted.

In Step 206, the input acquisition unit 102 obtains the image capturing start instruction from a user.

In Step 207, the image capturing units 110 and 120 start the image capturing in accordance with the synchronous signals 1 and 2 supplied from the synchronous signal control circuit 105. That is, the image capturing unit 110, in accordance with the synchronous signal 1, and the image capturing unit 120, in accordance with the synchronous signal 2, obtain Image 1 and Image 2, respectively, and stores the same into the storage unit 104 as moving-image data or outputs the same to the external output unit 103.

In this manner, when the image capturing mode is the in-phase mode, a stereoscopic moving image without a time lag between the left-eye moving image and the right-eye moving image is obtained, while when the image capturing mode is the anti-phase mode, a stereoscopic moving image with a time lag between the left-eye moving image and the right-eye moving image is obtained. Note that, in FIG. 3 and FIG. 4, t1, t2, t3, . . . tn indicate the sampling time from the image capturing start instruction to an image capturing termination instruction. For example, when the time period from the image capturing start instruction to the image capturing termination instruction is 10 seconds and the image capturing frame rate in this case is 30 fps, the sampling time t spans from t1 to t300 and therefore Image 1 and Image 2 include 300 frame images, respectively.

In Step 208, the CPU 101 determines whether or not the input acquisition unit 102 has obtained the image capturing termination instruction. If the image capturing termination instruction has not been obtained, the flow returns to Step 207 to continue the image capturing. On the other hand, if the image capturing termination instruction has been obtained, the flow proceeds to Step 209.

In Step 209, the image capturing units 110 and 120 terminate the image capturing. That is, the synchronous signal control circuit 105 terminates the outputting of the synchronous signals 1 and 2, and the image processing circuits 113 and 123 terminate the acquisition of the image signal.

In this manner, in the image capturing device 100 according to the embodiment, the image capturing mode corresponding to the display system of a display device selected by a user is set and a stereoscopic moving image is captured.

Figure 5A:
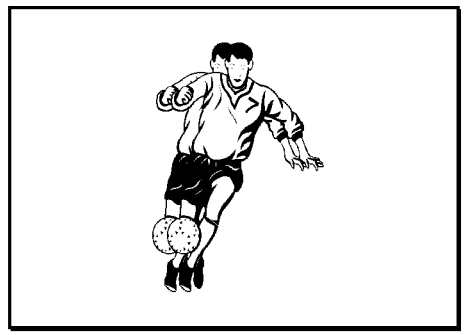
Figure 5B:

FIGS. 5A and 5B are views illustrating how a stereoscopic moving image captured by the image capturing device according to the embodiment looks when displayed on the display device. FIG. 5A shows, for comparison, how a stereoscopic moving image looks when the image capturing system and the display system do not agree with each other. That is, FIG. 5A shows how a stereoscopic moving image looks when the stereoscopic moving image captured in the in-phase mode is viewed with the display device of the active stereo system or when the stereoscopic moving image captured in the anti-phase mode is viewed with the display device of the passive stereo system. In this case, it may be seen that the motion area looks having a double image and the collapse of the motion area has occurred.

On the other hand, FIG. 5B shows how a stereoscopic moving image captured by the application of Embodiment 1 looks. When the embodiment is applied, a user appropriately selects the display system of a display device, and a stereoscopic moving image is captured in the image capturing mode corresponding to the selected display system and therefore the image capturing system and the display system always agree with each other and the collapse of a motion area will never occur.

As described above, because the embodiment assures in advance that a stereoscopic moving image is captured in an image capturing mode corresponding to the display system of a display device, the collapse of a motion area can be suppressed.

Embodiment 2

In Embodiment 1, the image capturing mode is determined based on the display mode of a display device which a user selects in advance. Next, an aspect, wherein an appropriate image capturing mode is automatically determined by obtaining, from the display device connected to the image capturing device, the information of the display system in the display device, is described as Embodiment 2. Note that the description of the portion common to Embodiment 1 is simplified or omitted and here the difference from Embodiment 1 will be mainly described.

Figure 6:
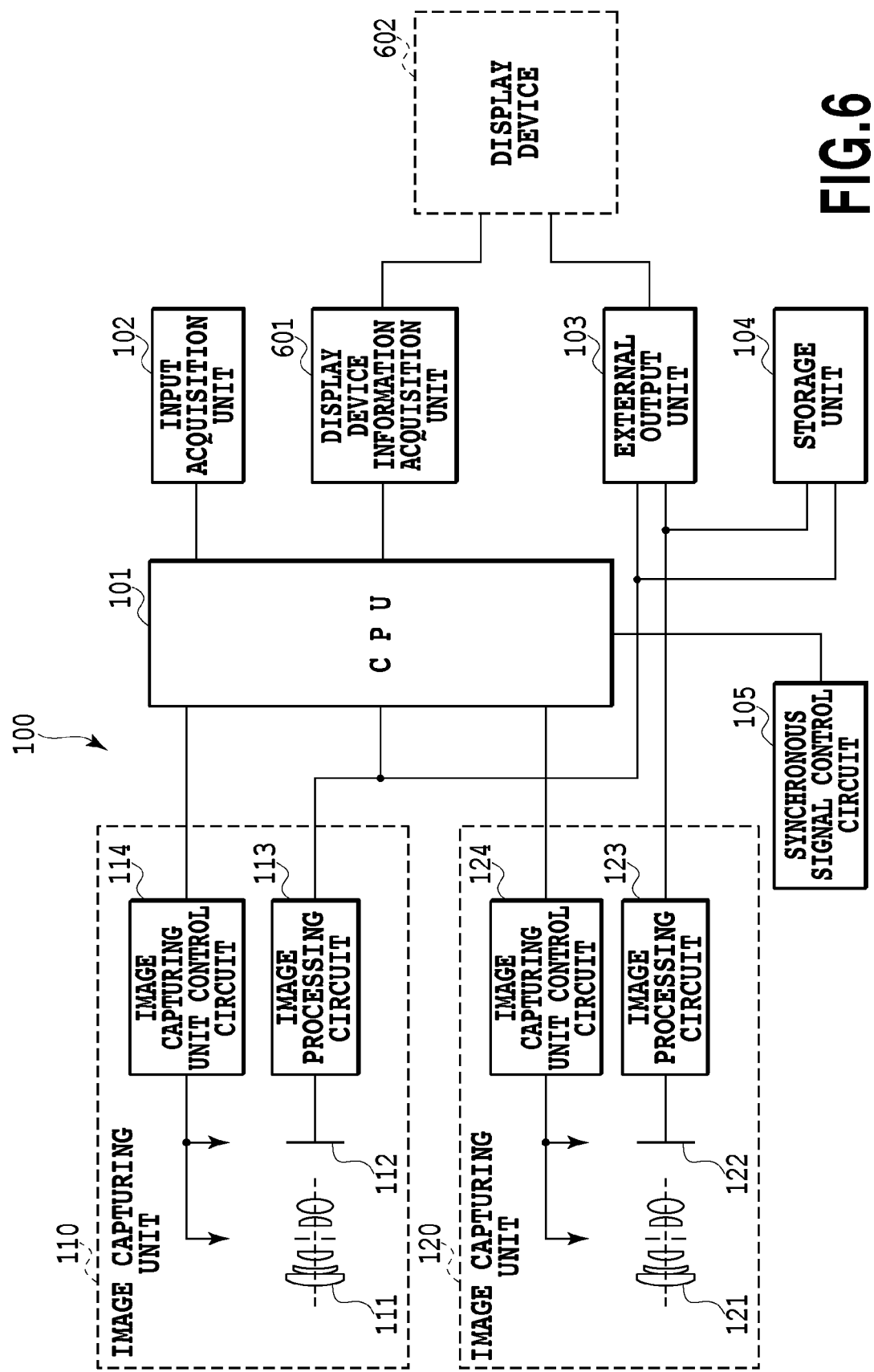
FIG. 6 is a view showing an example of the configuration of an image capturing device according to Embodiment 2.

FIG. 6 is a view showing an example of the configuration of the image capturing device 100 according to the embodiment. The difference from Embodiment 1 is that a display-device information acquisition unit 601 is added.

The image capturing device 100 is connected to a display device 602 by means of USB or the like, and the display-device information acquisition unit 601 obtains from the display device 602 the information (ModeDisp) of the display mode thereof. More specifically, a transmission instruction is issued from the image capturing device 100 to the display device 602 so as to transmit the information of the display mode, while the display device 602, in accordance with the received transmission instruction, returns the information of the display mode (information indicative of the active stereo system or the passive stereo system) to the image capturing device 100. Note that, the connection between the image capturing device 100 and the display device 602 may be made using a method, for example HDMI, a LAN cable, a wireless LAN, or the like, other than USB. The other configuration is the same as that of Embodiment 1 and therefore the description thereof is omitted.

Figure 7:
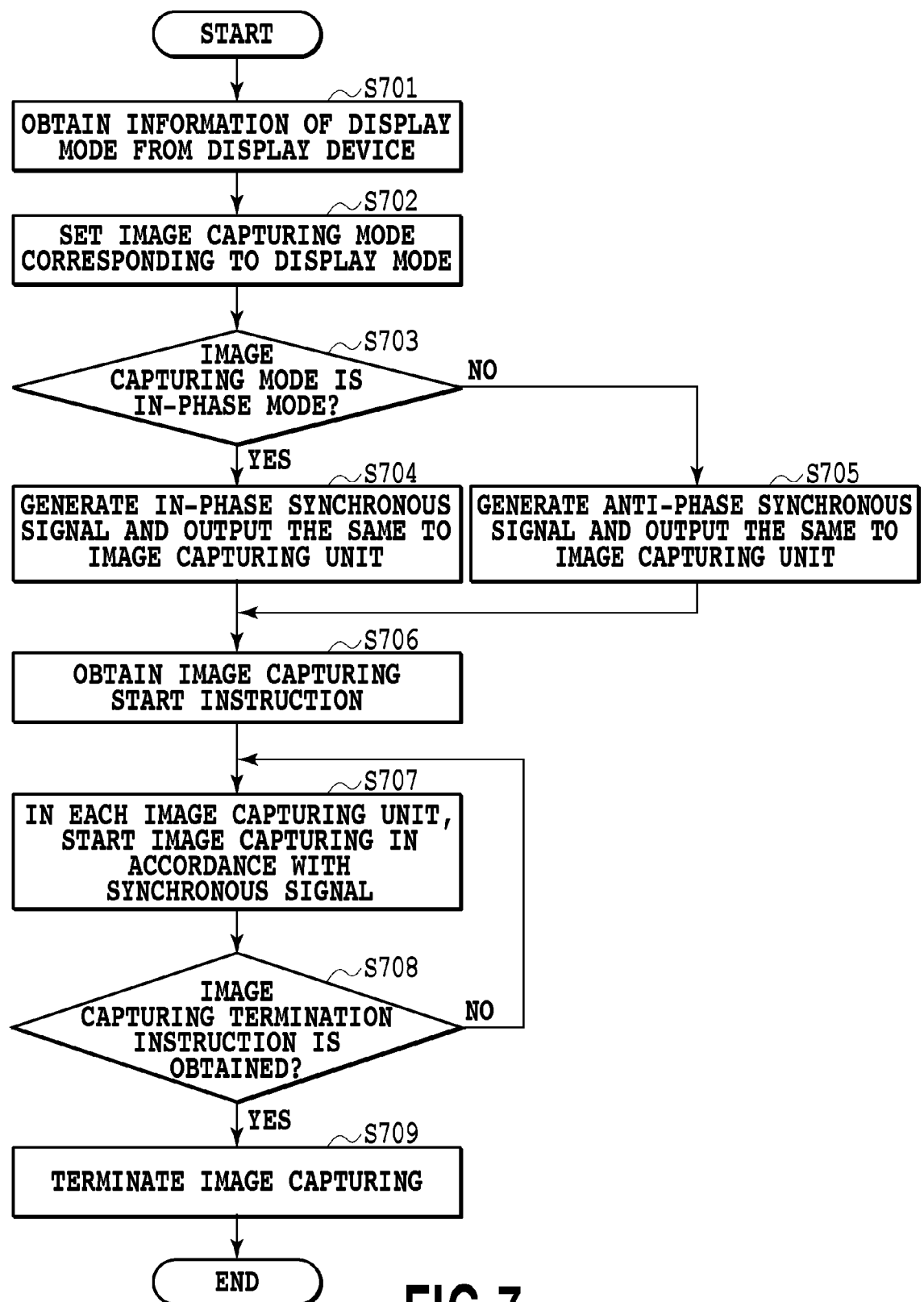
FIG. 7 is a flow chart showing the flow of the processes of capturing a stereoscopic moving image in the image capturing device according to Embodiment 2.

FIG. 7 is a flow chart showing the flow of the processes of capturing a stereoscopic moving image in the image capturing device 100 according to the embodiment.

In Step 701, the CPU 101 sends to the display device 602 an instruction to transmit the display mode information, and the display-device information acquisition unit 601 obtains the information of the display mode (ModeDisp) that is sent in response to the transmission instruction.

In Step 702, the CPU 101 sets the image capturing mode (ModeCam) corresponding to the obtained display mode information (ModeDisp). For example, if the obtained display mode information indicates the "passive stereo system", the image capturing mode (ModeCam) is set to the "in-phase mode" in which a left-eye moving image and a right-eye moving image are captured without a time lag. Similarly, if the obtained display mode information indicates the "active stereo system", the image capturing mode (ModeCam) is set to the "anti-phase mode" in which a left-eye moving image and a right-eye moving image are captured with a time lag. Note that, as with the case of Embodiment 1, the specification of the image capturing frame rate may be accepted from a user prior to Step 702 or a predetermined default value may be used.

Then, the subsequent processes of Step 703 to Step 709 are executed. The content of each process of Step 703 to Step 709 corresponds to that of Step 203 to Step 209 of the flow chart of FIG. 2 of Embodiment 1.

As described above, the embodiment also assures that a stereoscopic moving image is captured in an image capturing mode corresponding to the display system of a display device, and therefore the collapse of a motion area can be suppressed.

Embodiment 3

In Embodiment 1 and Embodiment 2, the image capturing mode is set by the image capturing device side so that the display system of the display device and the image capturing system of the image capturing device agree with each other. Next, an aspect, wherein a stereoscopic moving image captured by an arbitrary system is interpolated by the display device side so as to match the display system and is displayed, is described as Embodiment 3. Note that, the description of the portion common to Embodiment 1 and Embodiment 2 is simplified or omitted, and here the difference from them will be mainly described.

First, the overview of the embodiment is briefly described.

First, in the embodiment, in the image capturing device, the information related to the image capturing mode is added as metadata to the data of a captured stereoscopic moving image. In the display device, this metadata is analyzed to obtain the information of the image capturing mode, and the display method is controlled in accordance with the image capturing system of the moving-image data. Specifically, if the system with which the moving-image data was captured agrees with the display system of a display device, the moving-image data is reproduced as it is, but when it does not agree, a predetermined interpolation process is performed on the moving-image data and then the moving-image data is reproduced. Here, "agree with" refers to the case where both the image capturing system and the display system are the time division system or the case where both the image capturing system and the display system are the non-time division system. On the other hand, "does not agree" refers to the case where both the image capturing system and the display system are not in a correspondence relation, such as the case where the display system is the non-time division system but the image capturing system is the time division system (or vice versa). The interpolation includes two types: "dominant-eye interpolation" and "both-eyes interpolation". In the embodiment, a user selects one of "dominant-eye interpolation", "both-eyes interpolation", and "without interpolation" as the interpolation mode. Note that, the types of the interpolation process are not limited to the above-described two types, but may be a type considering other visual feature of a user, e.g., eyesight or the like.

Figure 8:
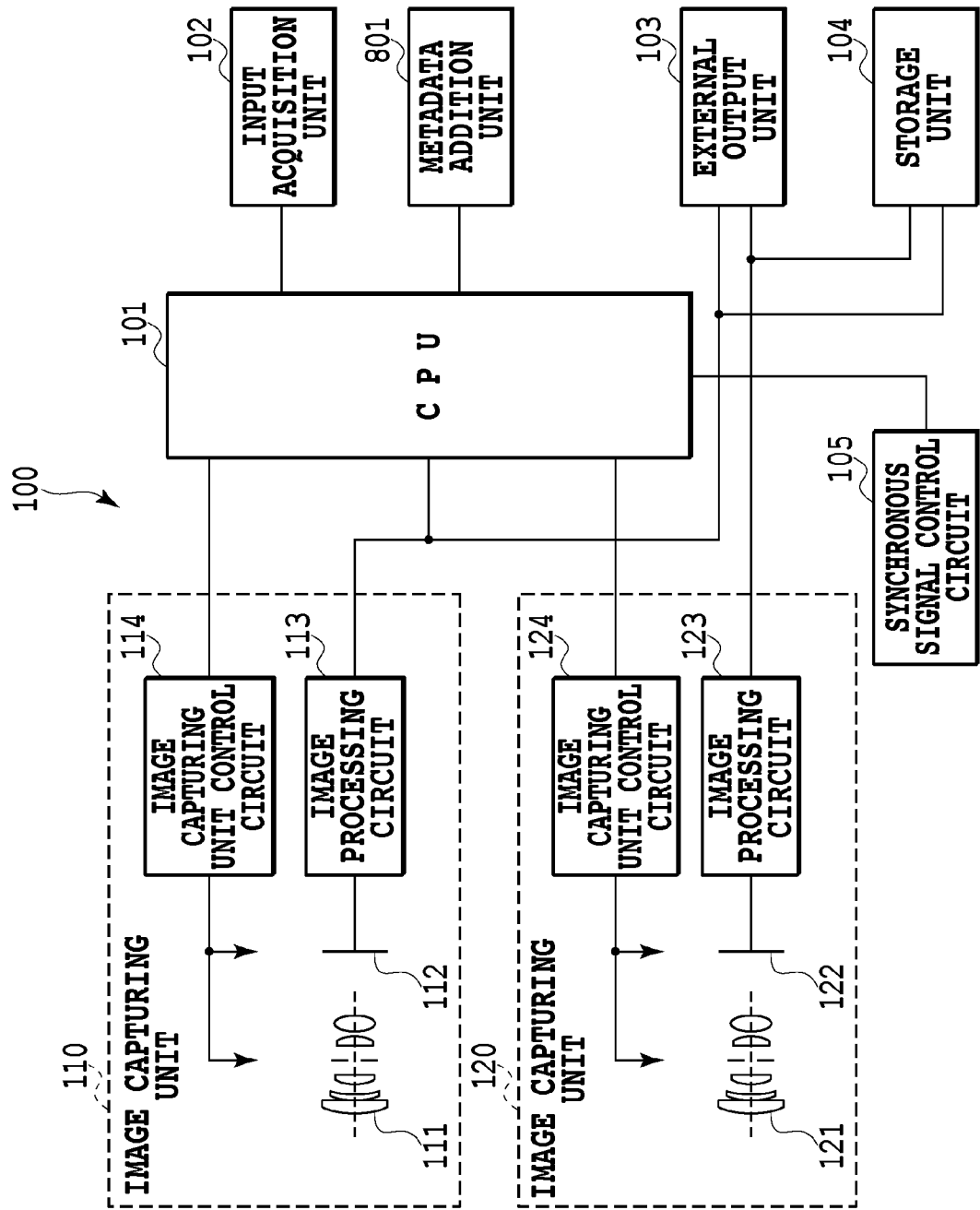
FIG. 8 is a view showing an example of the configuration of an image capturing device according to Embodiment 3.

FIG. 8 is a view showing an example of the configuration of the image capturing device according to the embodiment. The difference from Embodiment 1 is that a metadata addition unit 801 is added.

The metadata addition unit 801 adds the above-described metadata to the data of a stereoscopic moving image obtained by the image capturing unit 110 and the image capturing unit 120, respectively, and generates a moving-image file. The other configuration is the same as that of Embodiment 1 and therefore the description thereof is omitted.

Figure 9:
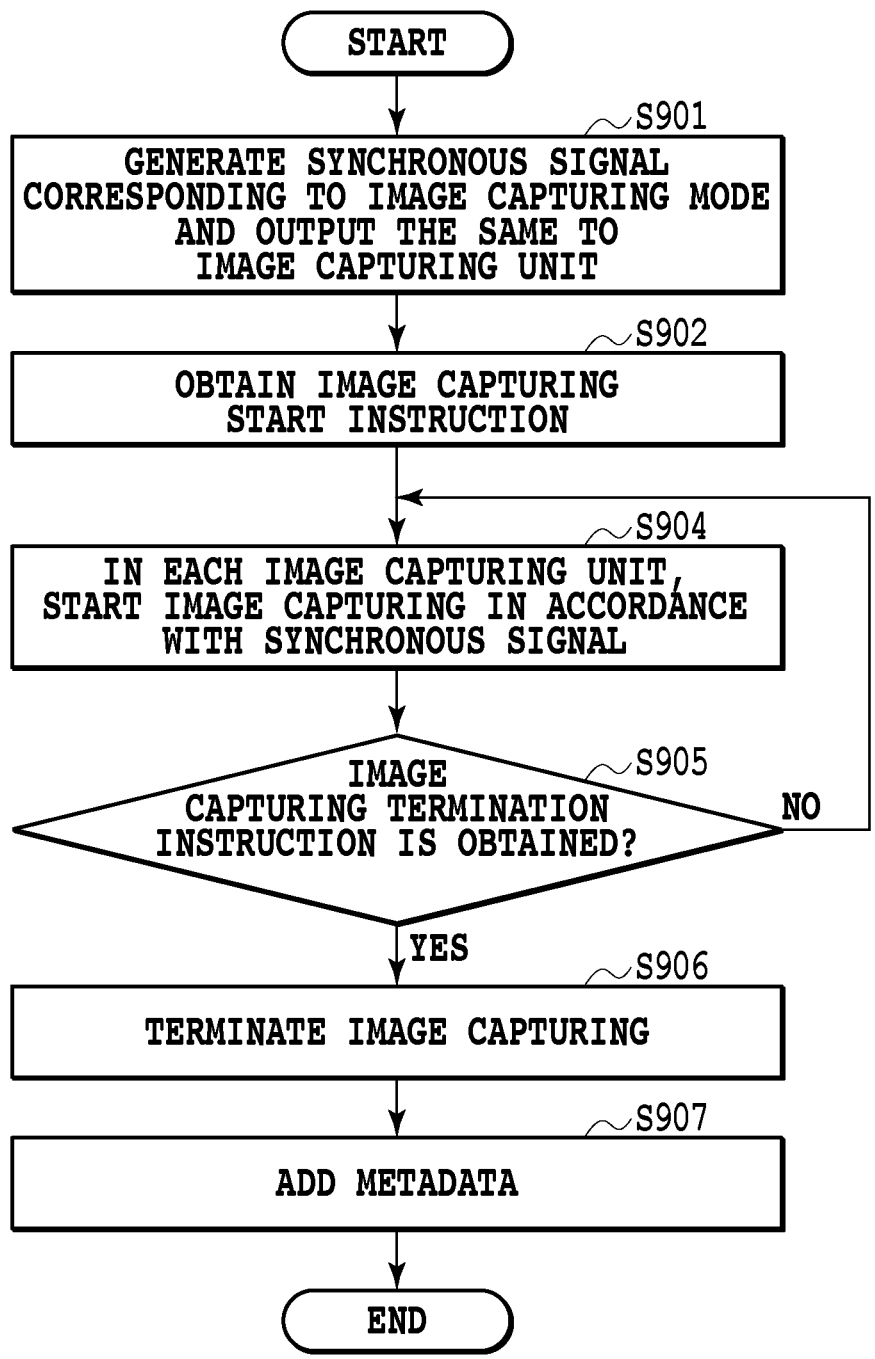
FIG. 9 is a flow chart showing the flow of processes in capturing a stereoscopic moving image in the image capturing device according to Embodiment 3.

FIG. 9 is a flow chart showing the process flow in capturing a stereoscopic moving image in the image capturing device 100 according to the embodiment.

In Step 901, the synchronous signal control circuit 105 generates the synchronous signals 1 and 2 corresponding to a predetermined image capturing mode at a predetermined image capturing frame rate, and outputs the same to both the image capturing units 110 and 120, respectively. For example, when the image capturing mode which the image capturing device 100 has is the in-phase mode, the synchronous signals 1 and 2 whose phases agree with each other are output to both the image capturing units 110 and 120, respectively. On the other hand, when the image capturing mode which the image capturing device 100 has is the anti-phase mode, the anti-phase synchronous signals 1 and 2 whose phases shift from each other by $1/(2 \times F)$ are output to both the image capturing units 110 and 120, respectively.

In the subsequent Step 902 to Step 906, the processes similar to those of Step 206 to Step 209 of the flow chart of FIG. 2 according to Embodiment 1 are executed. Note that, in the embodiment, all the data of stereoscopic moving images captured in Step 904 are once stored in the storage unit 104.

Figure 10:
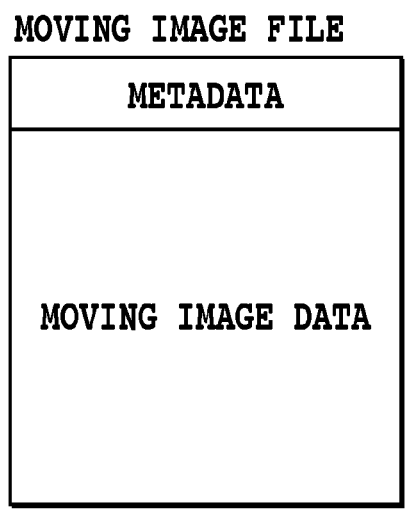
FIG. 10 is a view showing the data structure of a moving-image file of stereoscopic moving image data added with metadata.

In Step 907, the metadata addition unit 801 reads the data of the stereoscopic moving image stored in the storage unit 104, and adds the information (ModeCam) of the image capturing mode at the time of image capturing as the metadata. FIG. 10 is a view showing the data structure of a moving-image file of stereoscopic moving image data added with the metadata. In the example shown in FIG. 10, the metadata is added as the header of the moving-image data but may be added as the footer, for example.

In this manner, a moving-image file of stereoscopic moving image data added with the metadata is generated and sent to the display device via the external output unit 103.

Note that, in the flow chart of FIG. 9, the description has been made assuming that the image capturing device 100 has only either one of the in-phase mode or the anti-phase mode as the image capturing mode. The image capturing device according to the embodiment is not limited to such a type, but may have a capability to capture images even in either mode of the in-phase mode and the anti-phase mode and cause a user to select either one of them before starting image-capturing. In this case, in place of Step 901, the processes corresponding to those of Step 201 to Step 205 in the flow chart of FIG. 2 of Embodiment 1 may be executed. However, in the case of the embodiment, because the image capturing system and the display system are adjusted by the display device side, a user does not need to confirm its display system before selecting the display system on the display device side.

Next, the display device according to the embodiment is described.

Figure 11:
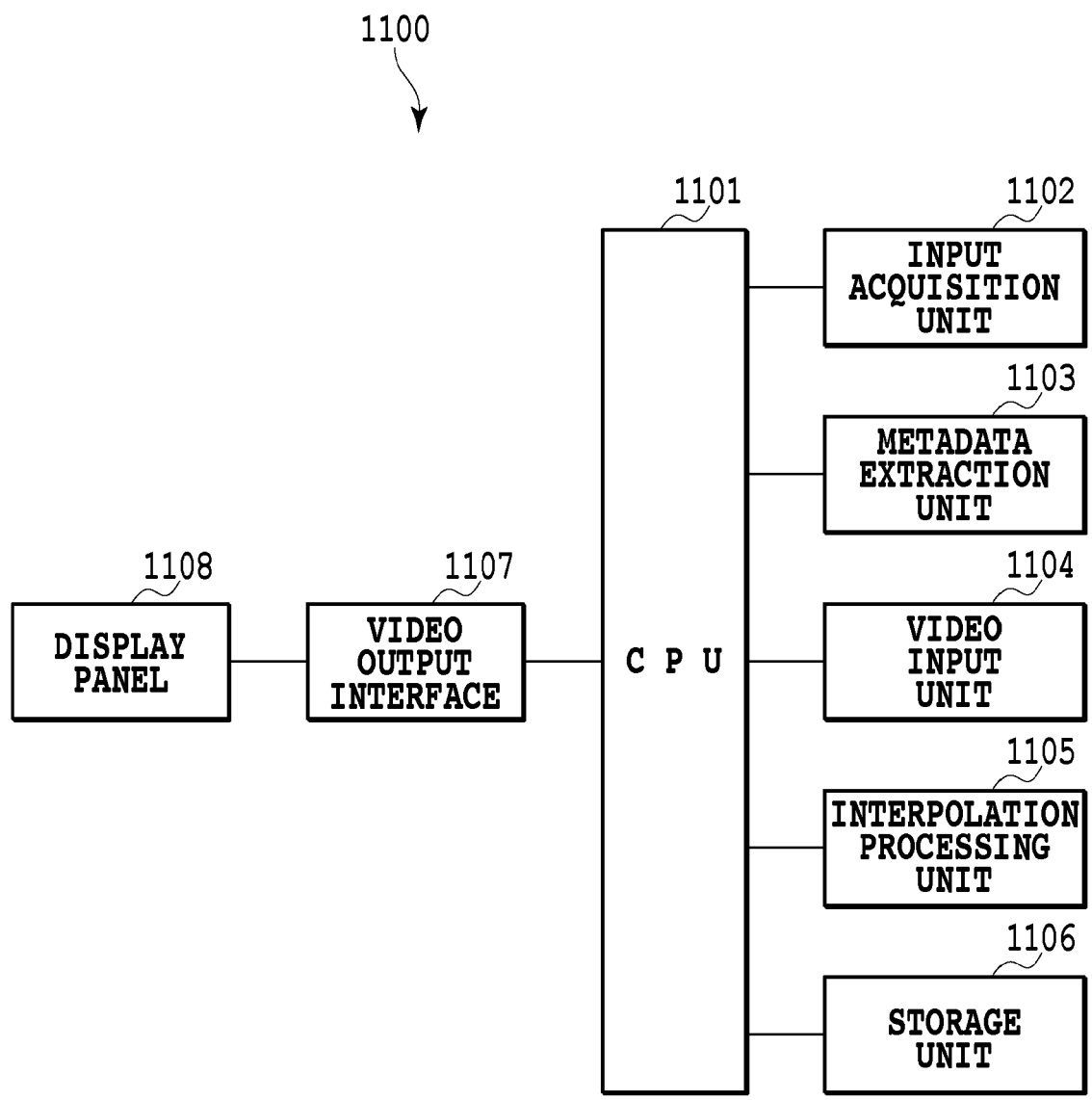
FIG. 11 is a view showing an example of the configuration of a display device according to the embodiment.

FIG. 11 is a view showing an example of the configuration of the display device according to the embodiment.

A display device 1100 includes a CPU 1101, an input acquisition unit 1102, a video input unit 1104, an interpolation processing unit 1105, a storage unit 1106, a video output interface 1107, and a display panel 1108.

The CPU 1101 is a processor integrally controlling the display device 1100. Although not illustrated, the display device 1100 also includes a ROM for storing a control program executed by the CPU 1101 and a RAM serving as the work area or the like of the CPU 1101.

The input acquisition unit 1102 obtains a user's selection, such as the interpolation mode (ModeMC) and the dominant-eye information (Effect), via a switch and a remote controller of the display device body. The interpolation mode includes the above-described three types ("without interpolation", "dominant-eye interpolation", and "both-eyes interpolation"). The dominant-eye information includes two types: "Right" indicating that the dominant eye is the right eye and "Left" indicating that the dominant eye is the right eye.

A metadata extraction unit 1103 extracts metadata from the input moving-image data and analyzes its content.

The video input unit 1104 obtains the above-described moving-image file as a video signal, for example, from the image capturing device 100 or the like.

The interpolation processing unit 1105 performs the interpolation process corresponding to a specified interpolation mode on the stereoscopic moving image data included in the input moving-image file.

The storage unit 1106 includes, for example, an HDD or the like and stores the moving-image file received from the image capturing device 100 or the like.

The video output interface 1107 converts the data of a stereoscopic moving image received from the video input unit 1104 or the interpolation processing unit 1105 to a format corresponding to the display system of the display panel 1108, and outputs the result to the display panel 1108. FIGS. 12A and 12B are views illustrating how a frame image in the moving-image data is displayed in the respective display systems, wherein FIG. 12A shows the case of the active stereo system and FIG. 12B shows the case of the passive stereo system. When the display panel 1108 is of the active stereo system, a left-eye moving image and a right-eye moving image are alternately and sequentially output as shown in FIG. 12A. On the other hand, when the display panel 1108 is of the passive stereo system, one frame image formed by alternately arranging a left-eye moving image and a right-eye moving image at each sampling time for each line is sequentially output as shown in FIG. 12B. In the video output interface 1107, as required, a process of converting stereoscopic moving image data to a format suitable for its display system is performed.

Figure 13:
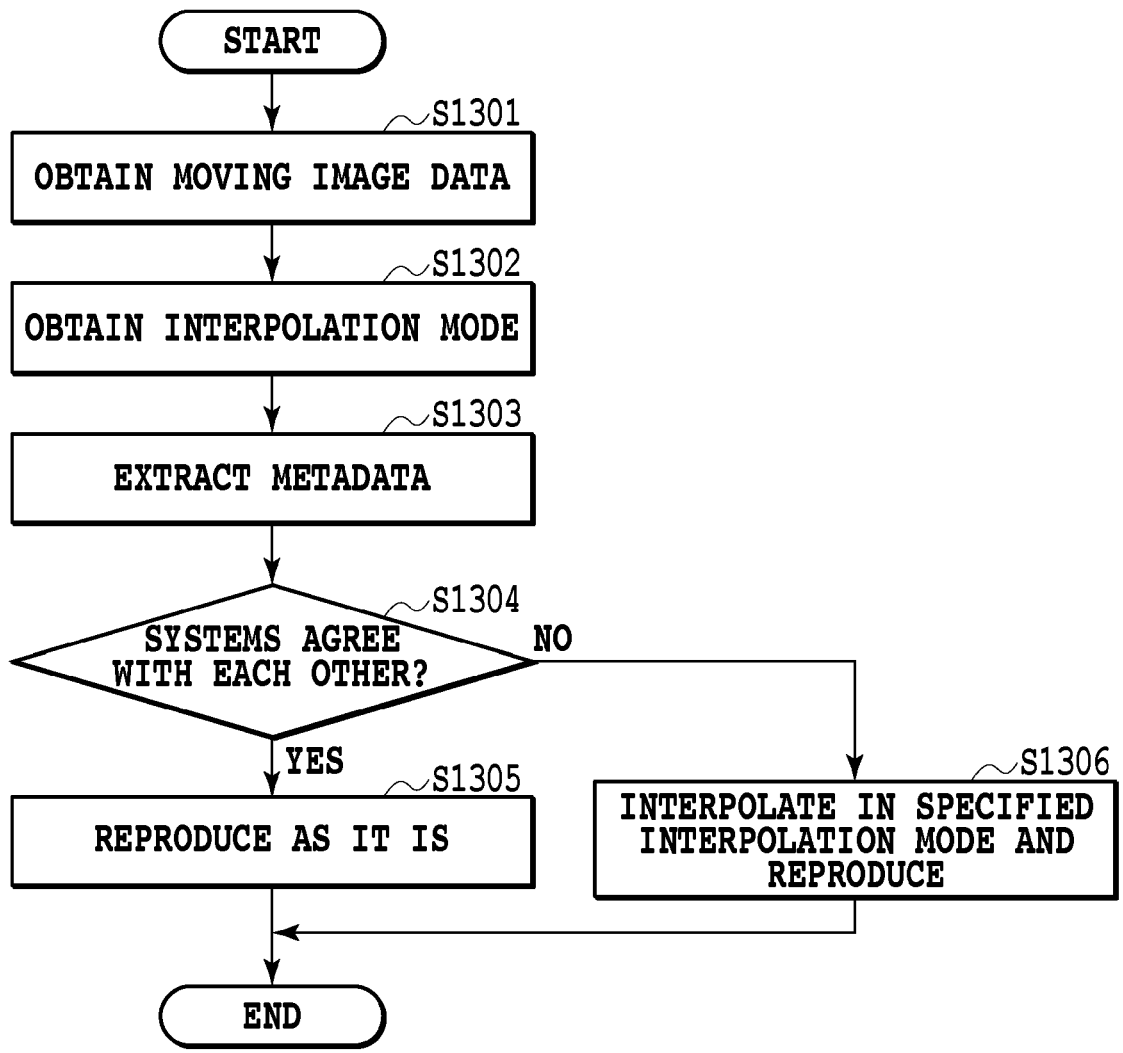
FIG. 13 is a flow chart showing the flow from a process of extracting metadata from a moving-image file and performing an interpolation process as required to a process of outputting the result to a display panel, in the display device according to Embodiment 3.

FIG. 13 is a flow chart showing the flow from the process of extracting metadata from an input moving-image file and performing the interpolation process as required to the process of outputting the result to the display panel 1108, in the display device 1100 according to the embodiment.

In Step 1301, the video input unit 1104 receives a moving-image file from the image capturing device 100.

In Step 1302, the input acquisition unit 1102 obtains the user's specification ("without interpolation", "dominant-eye interpolation", or "both-eyes interpolation") of the interpolation mode (ModeMC). In this case, when the interpolation mode specified by a user is "dominant-eye interpolation", the dominant-eye information (Effect) is also obtained at the same time.

In Step 1303, the metadata extraction unit 1103 extracts the metadata from the obtained moving-image file, and analyzes the information (ModeCam) of the image capturing mode included in the metadata.

In Step 1304, the CPU 1101, using the information of the image capturing mode in the extracted metadata, determines whether or not the image capturing system of the stereoscopic moving image in the received moving-image file agrees with the display system in the display device. For example, when the stereoscopic moving image is the data of the non-time division system captured in the in-phase mode but the display device is of the active stereo system, the both systems are determined not to agree with each other. Moreover, when the stereoscopic moving image is the data of the time division system captured in the anti-phase mode and the display device is also of the active stereo system, the both systems are determined to agree with each other. As the result of the determination, when the both systems agree with each other, the flow proceeds to Step 1305. On the other hand, when the both systems do not agree with each other, the flow proceeds to Step 1306.

In Step 1305, the CPU 1101, using the data of a stereoscopic moving image in the moving-image file obtained in Step 1301 as it is, reproduces the same with a predetermined display system. That is, the video output interface 1107 sequentially outputs the input moving images (ImageLeftIn and ImageRightIn) to the display panel 1108 as it is, as the moving image for output (ImageLeftOut and ImageRightOut).

In Step 1306, after performing the interpolation process, in accordance with the interpolation mode specified by a user, on the data of the stereoscopic moving image in the moving-image file obtained in Step 1301, the CPU 1101 reproduces the moving-image with a predetermined display system. That is, the interpolation processing unit 1105 performs, in accordance with the specified interpolation mode, the interpolation process on the input left-eye moving image (ImageLeftIn) and/or the right-eye moving image (ImageRightIn). In this manner, the moving images (ImageLeftOut and ImageRightOut) for output are generated and sequentially output to the display panel 1108.

Figure 14:
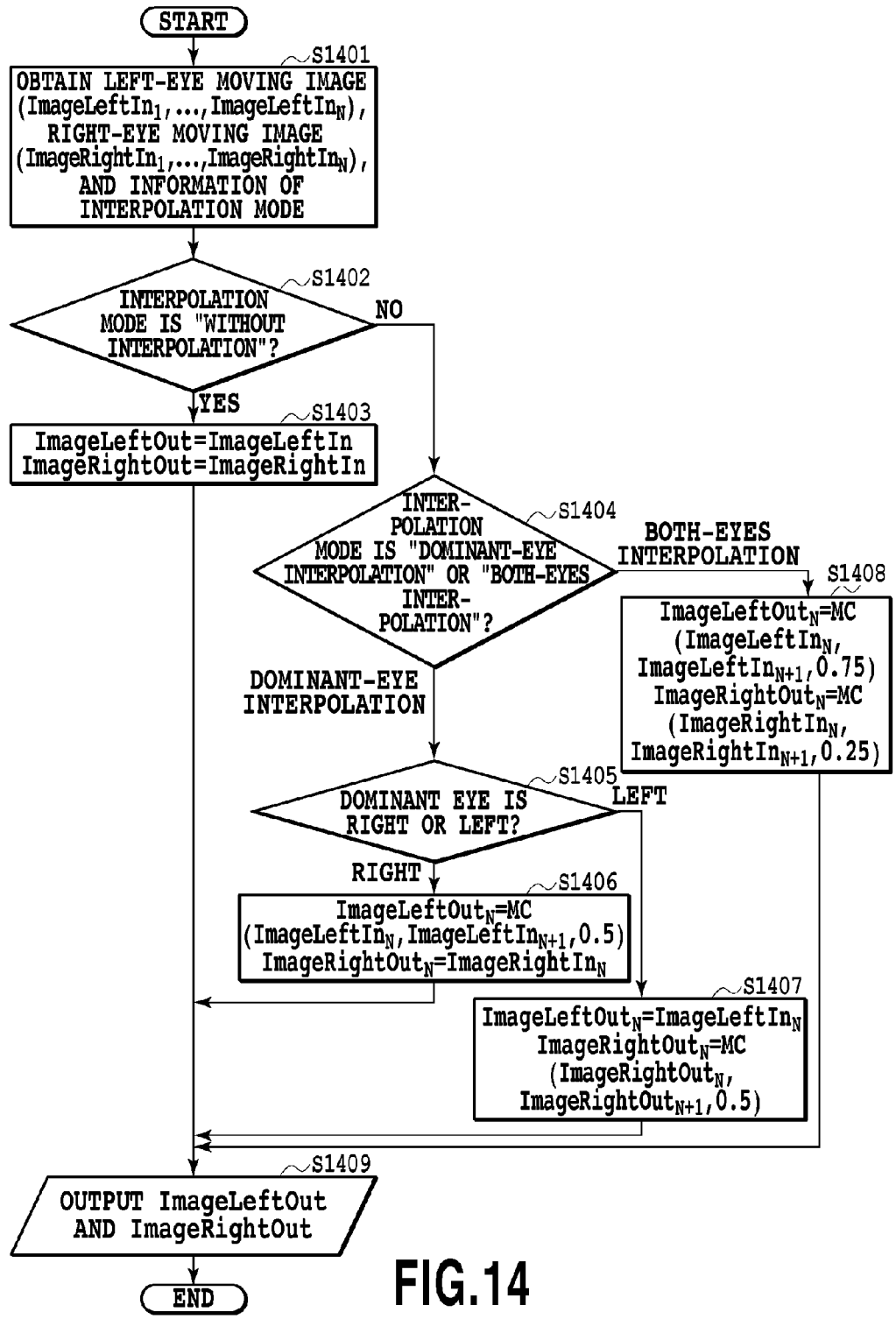
FIG. 14 is a flow chart showing a flow of the interpolation process in an interpolation processing unit.

FIG. 14 is a flow chart showing a flow of the interpolation process in the interpolation processing unit 1105.

In Step 1401, the interpolation processing unit 1105 obtains the left-eye moving image and right-eye moving image (ImageLeftIn$_1$, . . . , ImageLeftIn$_N$ and ImageRightIn$_1$, . . . , ImageRightIn$_N$) each including a plurality of frame images, and information of interpolation mode specified by user.

In Step 1402, the interpolation processing unit 1105 determines whether or not the content of the interpolation mode specified by a user is "without interpolation". Then, if it is "without interpolation", the flow proceeds to Step 1403, and otherwise the flow proceeds to Step 1404.

In Step 1403, the interpolation processing unit 1105 performs a process for outputting the input data of the left-eye moving image and the right-eye moving image as it is, without performing the interpolation process on this data. That is, ImageRightIn [i] (i=1, . . . , n) is substituted into ImageRight- Out [i] (i=1, ..., n). Moreover, ImageLeftIn{i} (i=1, ..., n) is substituted into ImageLeftOut [i] (i=1, ..., n).

In Step 1404, the interpolation processing unit 1105 determines whether the content of the interpolation mode specified by a user is "dominant-eye interpolation" or "both-eyes interpolation". If it is "dominant-eye interpolation", the flow proceeds to Step 1405, while if it is "both-eyes interpolation", the flow proceeds to Step 1408.

First, the interpolation process (Step 1405 to Step 1407) in the case of the "dominant-eye interpolation" is described.

In Step 1405, the interpolation processing unit 1105 determines, based on the dominant-eye information (Effect) obtained in Step 1401, whether the dominant eye is right or left. As the result of the determination, when the dominant eye is right, the flow proceeds to Step 1406, while when the dominant eye is left, the flow proceeds to Step 1407.

In Step 1406, the interpolation processing unit 1105 generates a left-eye moving image (ImageLeftOut$_N$) and right-eye moving image (ImageRightOut$_N$) for output using Expression (1) below.

[Formula 1]

$$\text{ImageLeftOut}_N = MC(\text{ImageLeftIn}_N, \text{ImageLeftIn}_{N+1}, P)$$

$$\text{ImageRightOut}_N = \text{ImageRightIn}_N \qquad \text{Expression (1)}$$

Here, MC is an intermediate image generation function, and is the function to generate, from a frame image (ImageLeftIn$_N$) of a first parameter and a frame image (ImageLeftIn$_{N+1}$) of a second parameter, an intermediate image serving as a motion between both frame images. P that is a third parameter has a value of not less than 0 and not more than 1, thereby generating an intermediate image at a time corresponding to a specified value. For example, when the value of the specified P is zero, the intermediate image to be generated is the frame image (ImageLeftIn$_N$) of the first parameter. Similarly, when the value of the specified P is one, the intermediate image to be generated is the frame image (ImageLeftIn$_{N+1}$) of the second parameter. Then, for example, if the value of the specified P is 0.5, an image corresponding to an exactly intermediate motion of the frame image (ImageLeftIn$_N$) of the first parameter and the frame image (ImageLeftIn$_{N+1}$) of the second parameter is output as the intermediate image. That is, by setting the P value to 0.5, the phase can be shifted by a half frame. Then, in this step when the dominant eye is right, because the interpolation process is performed on the data of the left-eye moving image on the opposite side of the dominant eye, Expression (1) above is employed and 0.5 will be specified as the P value in this case. Note that, for generation of an intermediate image in this case, a well-known approach, for example, such as interframe interpolation based on motion compensation, is applied.

In Step 1407, the interpolation processing unit 1105 generates the left-eye moving image (ImageLeftOut$_N$) and right-eye moving image (ImageRightOut$_N$) for output using Expression (2) below.

[Formula 2]

$$\text{ImageLeftOut}_N = \text{ImageLeftIn}_N$$

$$\text{ImageRightOut}_N = MC(\text{ImageRightIn}_N, \text{ImageRightIn}_{N+1}, P) \qquad \text{Expression (2)}$$

Thus, in this step when the dominant eye is left, the interpolation process is performed on the data of the right-eye image on the opposite side of the dominant eye.

Next, the interpolation process (Step 1408) in the case of "both-eyes interpolation" is described.

In Step 1408, the interpolation processing unit 1105 generates the left-eye moving image (ImageLeftOut$_N$) and right-eye moving image (ImageRightOut$_N$) for output using Expression (3) below.

[Formula 3]

$$\text{ImageLeftOut}_N = MC(\text{ImageLeftIn}_N, \text{ImageLeftIn}_{N+1}, 0.75)$$

$$\text{ImageRightOut}_N = MC(\text{ImageRightIn}_N, \text{ImageRightIn}_{N+1}, 0.25) \qquad \text{Expression (3)}$$

As apparent from Expression (3) above, in the case of "both-eyes interpolation", the interpolation process is performed on the both data of the left-eye moving image and the right-eye moving image. Here, for the left-eye moving image, the P value is set to 0.75, while for the right-eye moving image the P value is set to 0.25. As a result, the intermediate image to be generated is sampled at a temporally more leading position (in the case where the P value is close to 1) or at a temporally more lagging position (the P value is close to 0), and therefore a blocky distortion due to an error in motion estimation becomes inconspicuous. Note that, the phase may shift by a half frame between the left-eye moving image and the right-eye moving image, and therefore as a combination of P values, for example "0.2 and 0.7", "0.3, and 0.8", or the like may be employed.

In Step 1409, the interpolation processing unit 1105 outputs the data (ImageRightOut and ImageLeftOut) of the generated left-eye moving image and right-eye moving image to the video output interface 1107.

FIGS. 15A to 15C show how the data of a stereoscopic moving image captured in the in-phase mode is interpolated in accordance with the interpolation mode and displayed on a display device of the active stereo system.

FIG. 15A shows a display result when the specified interpolation mode is "without interpolation". In the image capturing device, the moving images are captured in the "in-phase mode" and there is no phase shift between the right-eye moving image and the left-eye moving image, and these moving images are output as it is, as the stereoscopic moving image for output, and are displayed with the phase shifted from each other by a half frame by the display device side. That is, because the moving-image data is reproduced with the discrepancy between the image capturing system and the display system not being corrected, the collapse of a motion area as shown in FIG. 5A occurs.

On the other hand, FIG. 15B shows a display result when the specified interpolation mode is "dominant-eye interpolation" and the dominant eye is right (the P value is 0.5). In this case, for the right eye that is the dominant eye, the input data of a right-eye moving image is used as it is, while for the left eye that is not the dominant eye, the interpolated data of the left-eye moving image is used. In this case, because the output left-eye moving image (ImageLeftOut) is an intermediate image shifting in the time direction by a half frame, the discrepancy between the image capturing system and the display system is corrected. Accordingly, the collapse of a motion area is alleviated in viewing the moving images. Also in this case, a blocky distortion may appear in a part of the image due to a failure in the motion estimation in the motion compensation interpolation process, but because the interpolated moving image is displayed to the eye opposite to the dominant eye, image degradation can be made inconspicuous.

FIG. 15C shows a display result when the specified interpolation mode is the "both-eyes interpolation" and the specified P value is 0.75 for the left eye and 0.25 for the right eye. In this case, a moving image including the interpolated intermediate image is displayed to both the left eye and the right eye, respectively. Specifically, a moving image including an intermediate image at a temporally more leading position is displayed for the left-eye moving image with the value of 0.75, while for the right-eye moving image with the value of 0.25, a moving image including an intermediate image at a temporally more lagging position is displayed. Also in this case, the discrepancy between the image capturing system and the display system is corrected and thus the collapse of a motion area is alleviated.

Note that, because "dominant-eye interpolation" and "both-eyes interpolation" each have drawbacks and advantages, a user may select depending on his/her preference.

As describe above, according to the embodiment, a stereoscopic moving image captured by any system is interpolated by the display device side so as to match its display system and is displayed, and therefore the collapse of a motion area can be significantly alleviated. Furthermore, by displaying the interpolated moving image to the eye that is not the user's dominant eye and displaying a moving image at the time of image capturing to the dominant eye as it is, the collapse of a motion area can be made more inconspicuous.

Embodiment 4

Figure 16:
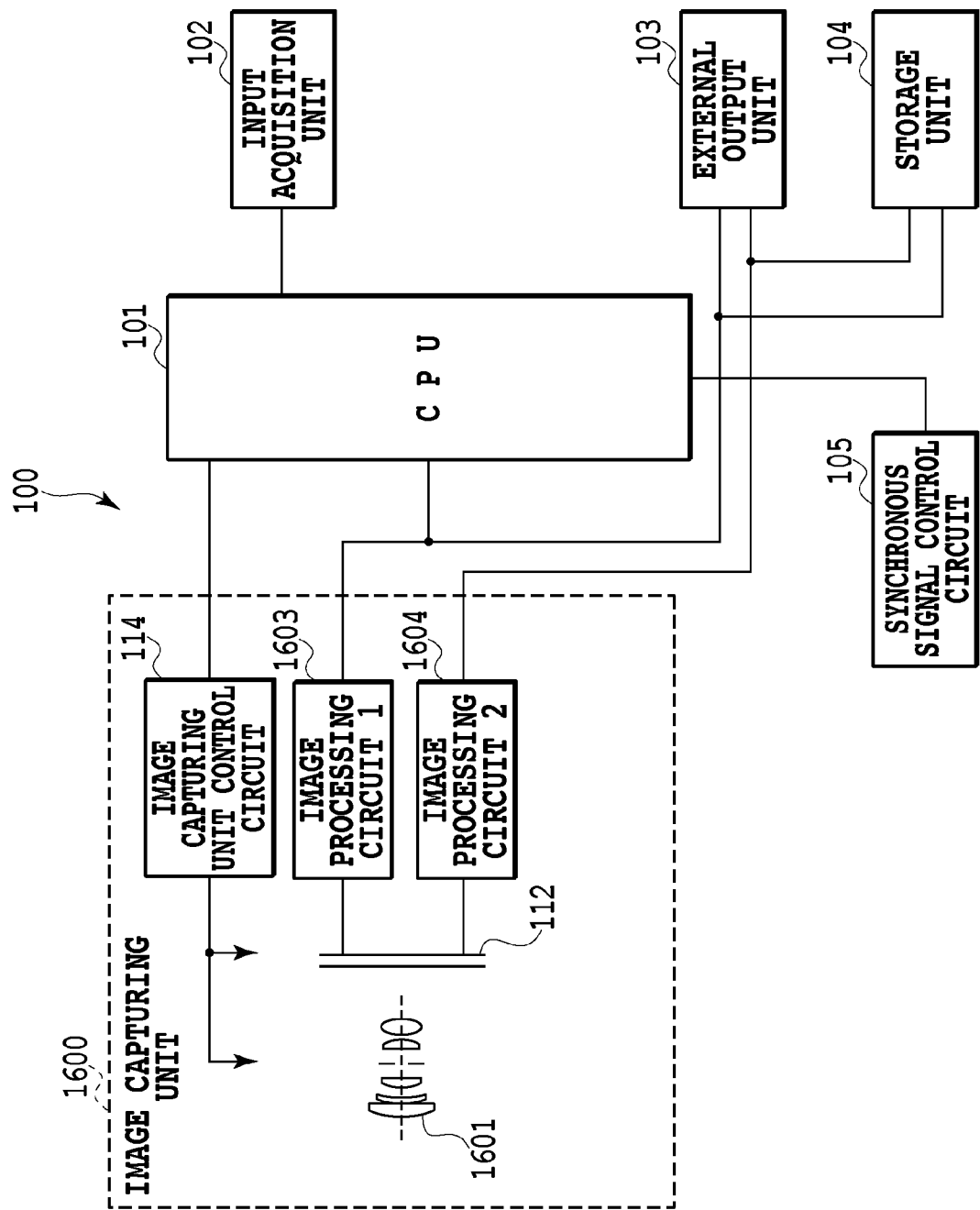
FIG. 16 is a view showing an example of the configuration of an image capturing device with one image capturing unit, according to Embodiment 4.

In Embodiments 1 to 3, it is assumed that the capturing of a stereoscopic moving image to be displayed on a display device is performed by an image capturing device with two image capturing units. However, the number of image capturing units in the image capturing device may be one. FIG. 16 is a view showing an example of the configuration of an image capturing device when the number of image capturing units is one. Note that, the portion common to FIG. 1 according to Embodiment 1 is designated by the common reference numeral to omit the description thereof.

As shown in FIG. 16, the image capturing device according to the embodiment includes only one image capturing unit 1600. In the image capturing unit 1600, an image capturing lens 1601 having two optical systems mounted within a lens mount diameter is used. Then, as with Embodiment 1 and the like, image signals from the image capturing element 112, which are obtained in accordance with the synchronous signals 1 and 2, respectively, are processed by the image processing circuit 1 (1603) and the image processing circuit 2 (1604), respectively. Thus, with one image capturing element 112, a stereoscopic moving image including the left-eye and right-eye moving images with parallax can be captured.

Thus, the present invention is applicable to an image capturing device having only one image capturing unit as described above and also to a stereoscopic moving image captured in the image capturing device.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-206171, filed Sep. 21, 2011, which is hereby incorporated by reference herein in its entirety.

What is claimed is:

1. An image capturing device for capturing a stereoscopic moving image including a right-eye moving image and a left-eye moving image, the device comprising:
a user interface to which a user inputs information on a display system of a display device displaying the stereoscopic moving image;
a setting unit configured to set an image capturing mode in accordance with the information with regard to the display system input via the user interface, wherein an in-phase mode for causing the captured right-eye moving image and the left-eye moving image to be in-phase is set when the display system is a passive stereo system, and an anti-phase mode for causing the captured right-eye moving image and the left-eye moving image to be anti-phase is set when the display system is an active stereo system;
a synchronous signal control unit configured to output in in-phase a synchronous signal for capturing the right-eye moving image and a synchronous signal for capturing the left-eye moving image when the set image capturing mode is the in-phase mode, and to output in anti-phase the synchronous signal for capturing the right-eye moving image and the synchronous signal for capturing the left-eye moving image when the set image capturing mode is the anti-phase mode; and
an image capturing unit configured to capture the right-eye moving image and the left-eye moving image in accordance with the output synchronous signal in response to an image capturing start instruction.

2. An image capturing method for capturing a stereoscopic moving image including a right-eye moving image and a left-eye moving image with an image capturing device having a display device displaying the stereoscopic moving image and a user interface to which a user inputs information on a display system of a display device, the method comprising:
setting an image capturing mode in accordance with the information with regard to the display system input via the user interface, wherein an in-phase mode for causing the captured right-eye moving image and the left-eye moving image to be in-phase is set when the display system is a passive stereo system, and an anti-phase mode for causing the captured right-eye moving image and the left-eye moving image to be anti-phase when the display system is an active stereo system;
controlling a phase of a synchronous signal by outputting in in-phase a synchronous signal for capturing the right-eye moving image and a synchronous signal for capturing the left-eye moving image when the set image capturing mode is the in-phase mode, and outputting in anti-phase the synchronous signal for capturing the right-eye moving image and the synchronous signal for capturing the left-eye moving image when the set image capturing mode is the anti-phase mode; and capturing the right-eye moving image and the left-eye moving image in accordance with the output synchronous signal in response to an image capturing start instruction.

3. A non-transitory computer readable storage medium storing a program for causing a computer to perform an image capturing method for capturing a stereoscopic moving image including a right-eye moving image and a left-eye moving image with an image capturing device having a display device displaying the stereoscopic moving image and a user interface to which a user inputs information on a display system of a display device, the method comprising:

setting an image capturing mode in accordance with the information with regard to the display system input via the user interface, wherein an in-phase mode for causing the captured right-eye moving image and the left-eye moving image to be in-phase is set when the display system is a passive stereo system, and an anti-phase mode for causing the captured right-eye moving image and the left-eye moving image to be anti-phase when the display system is an active stereo system;

controlling a phase of a synchronous signal by outputting in in-phase a synchronous signal for capturing the right-eye moving image and a synchronous signal for capturing the left-eye moving image when the set image capturing mode is the in-phase mode, and outputting in anti-phase the synchronous signal for capturing the right-eye moving image and the synchronous signal for capturing the left-eye moving image when the set image capturing mode is the anti-phase mode; and capturing the right-eye moving image and the left-eye moving image in accordance with the output synchronous signal in response to an image capturing start instruction.

4. The image capturing device according to claim 1, wherein the user interface is further configured to allow a user to input information on a frame rate at a time of image capturing, wherein the setting unit is further configured to set the frame rate input via the user interface as a frame rate at the time of image capturing, and wherein the image capturing unit is further configured to capture images in accordance with the set frame rate.

5. The image capturing device according to claim 1, further comprising a unit configured to output a frame image for a preview display, the frame image being obtained prior to obtaining the image capturing start instruction.

* * * * *